Jan. 18, 1966    G. A. SPILLSON    3,229,849
COMPARTMENTED ARTICLE CARRIER
Filed Jan. 23, 1964    7 Sheets-Sheet 1
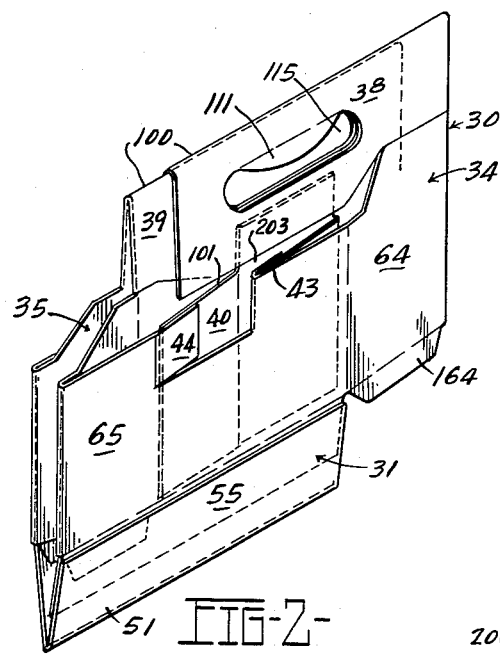
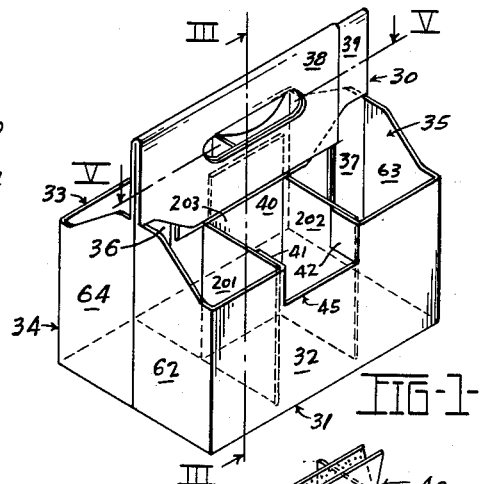
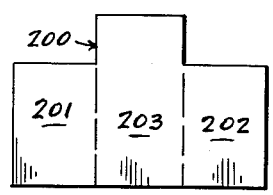
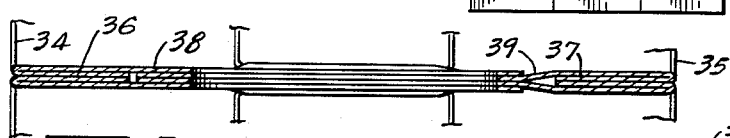
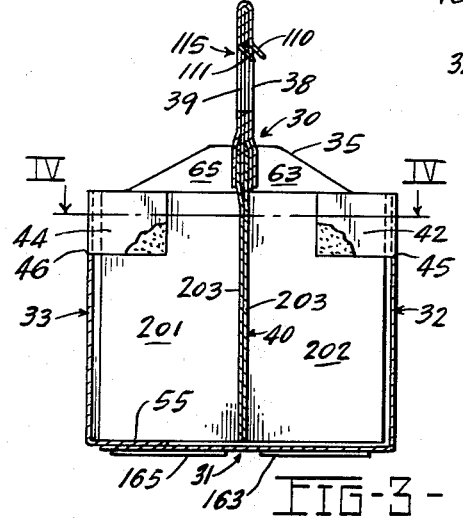
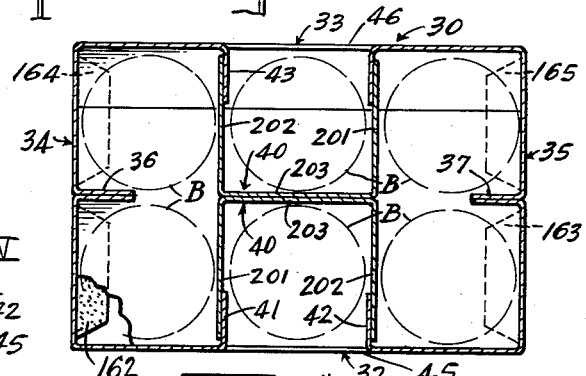
INVENTOR:
GEORGE A. SPILLSON.
BY
ATT'Y.

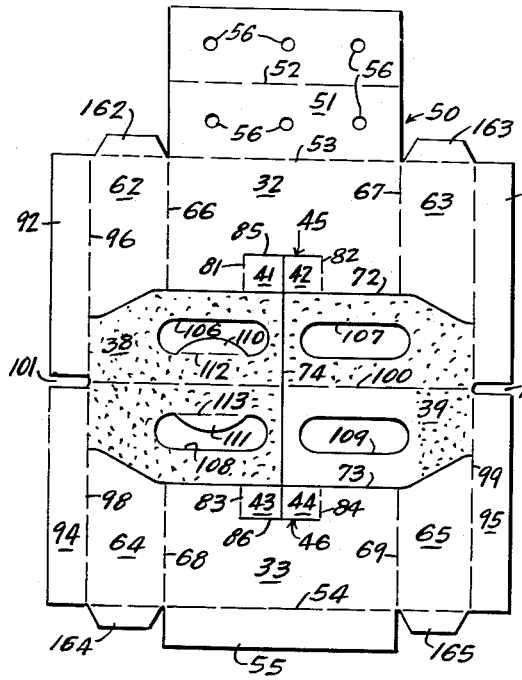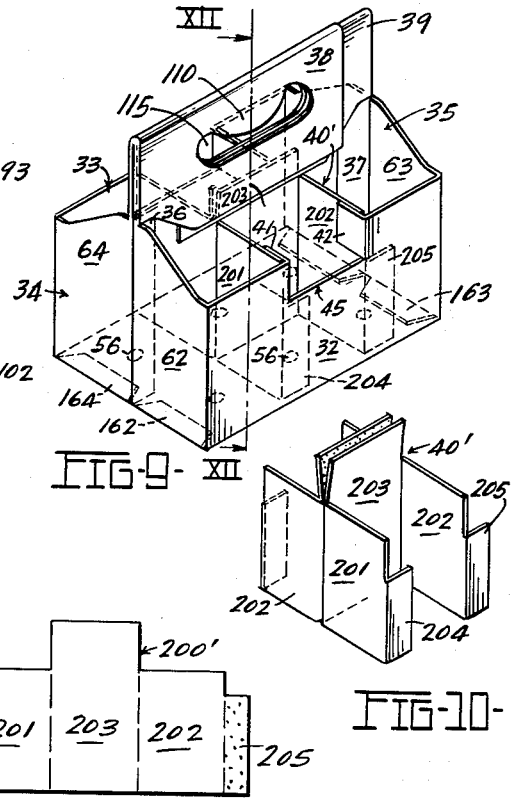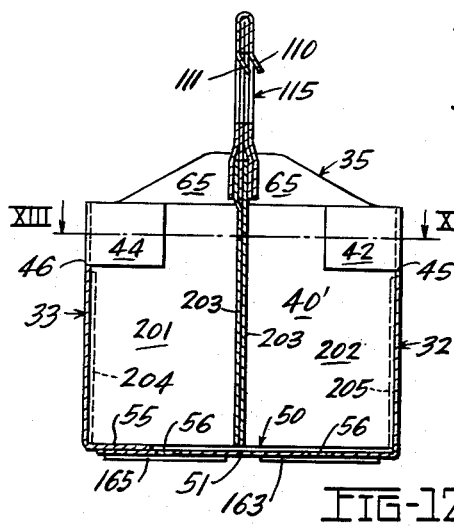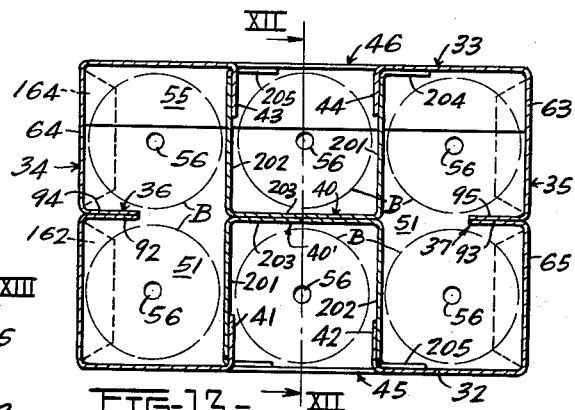

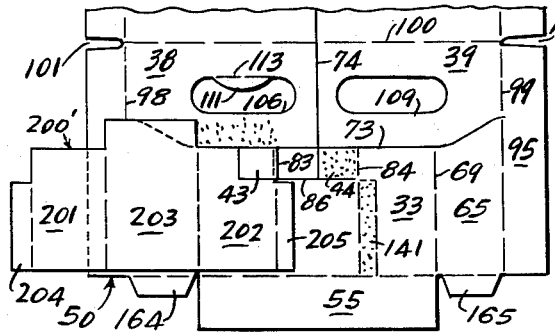
FIG-14-
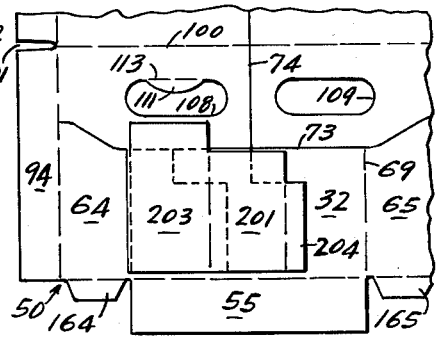
FIG-15-
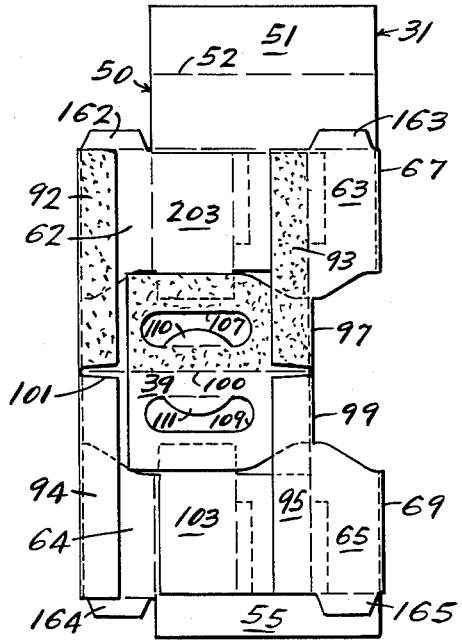
FIG-16-
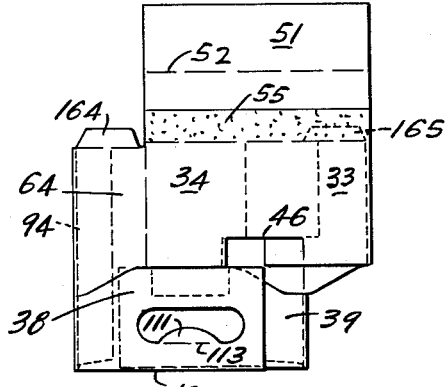
FIG-17-

Jan. 18, 1966 G. A. SPILLSON 3,229,849
COMPARTMENTED ARTICLE CARRIER
Filed Jan. 23, 1964 7 Sheets-Sheet 4
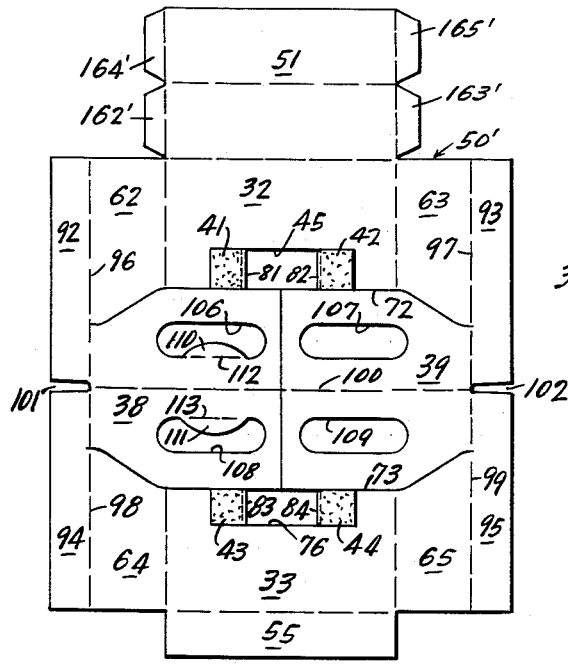
FIG-19-
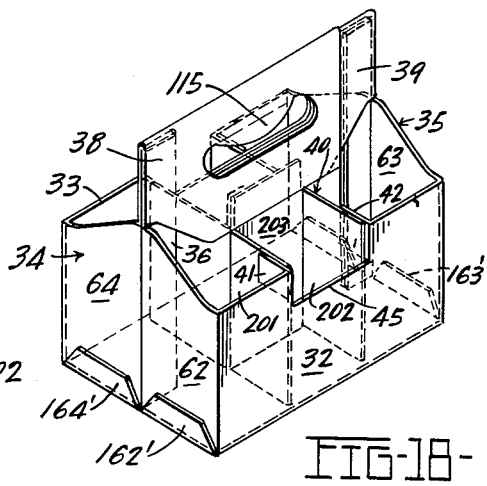
FIG-18-
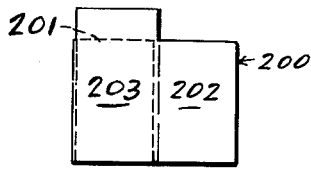
FIG-20-
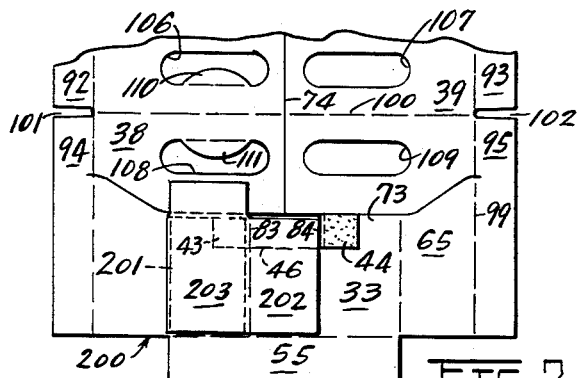
FIG-21-
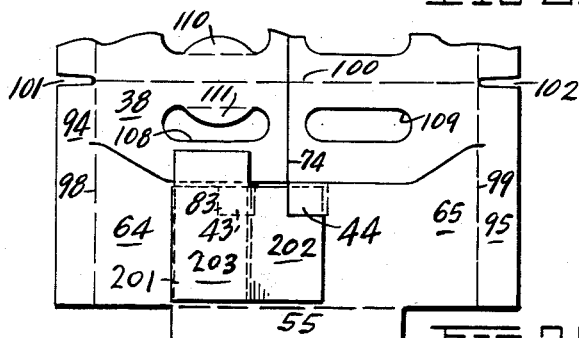
FIG-22-
INVENTOR:
GEORGE A. SPILLSON.
BY
ATT'Y.

Jan. 18, 1966   G. A. SPILLSON   3,229,849
COMPARTMENTED ARTICLE CARRIER
Filed Jan. 23, 1964   7 Sheets-Sheet 5
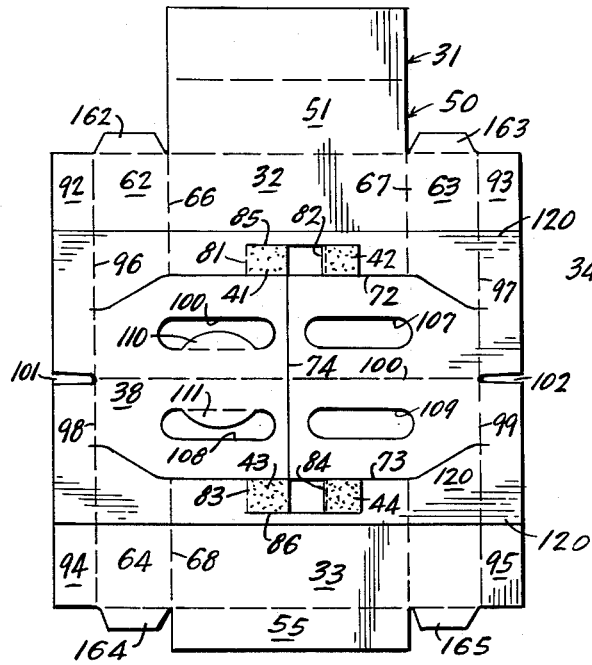
FIG-24-
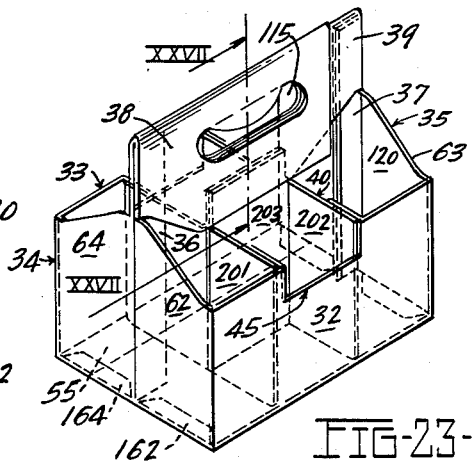
FIG-23-
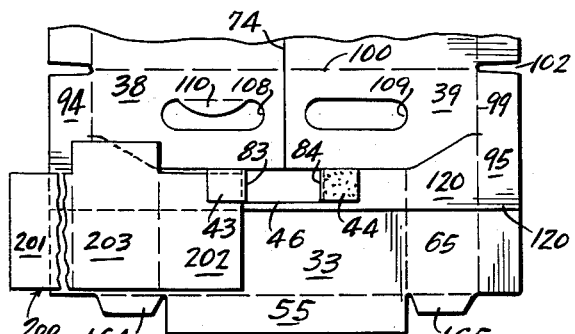
FIG-25-
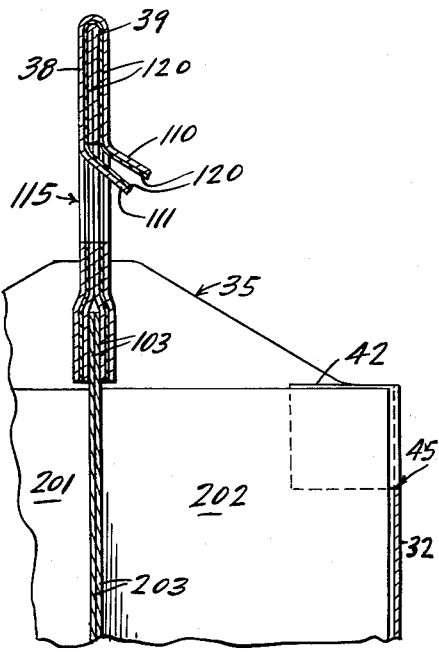
FIG-27-
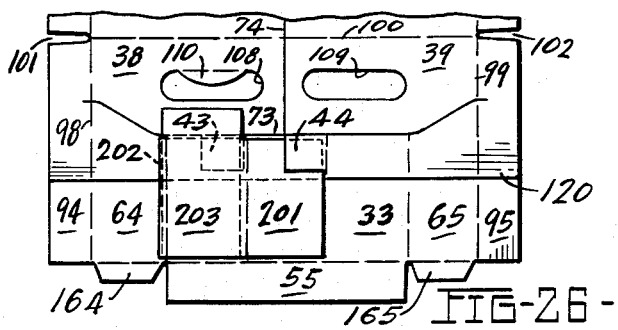
FIG-26-
INVENTOR:
GEORGE A. SPILLSON.
BY
ATT'Y.

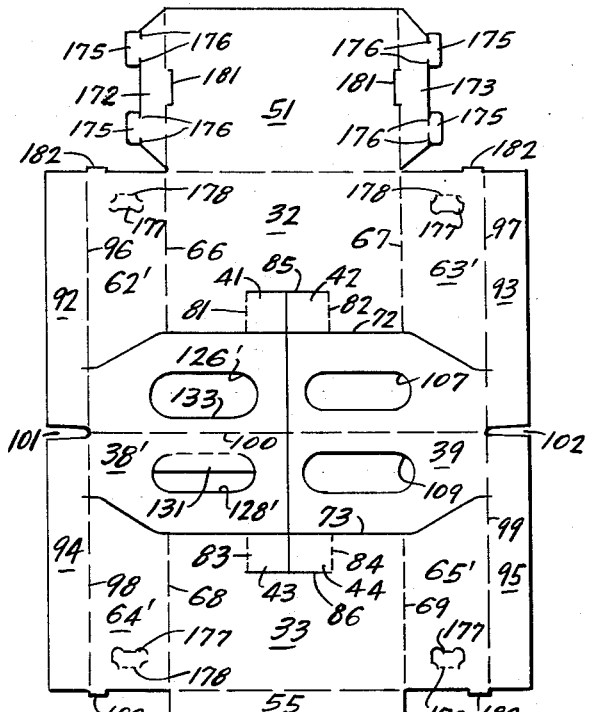

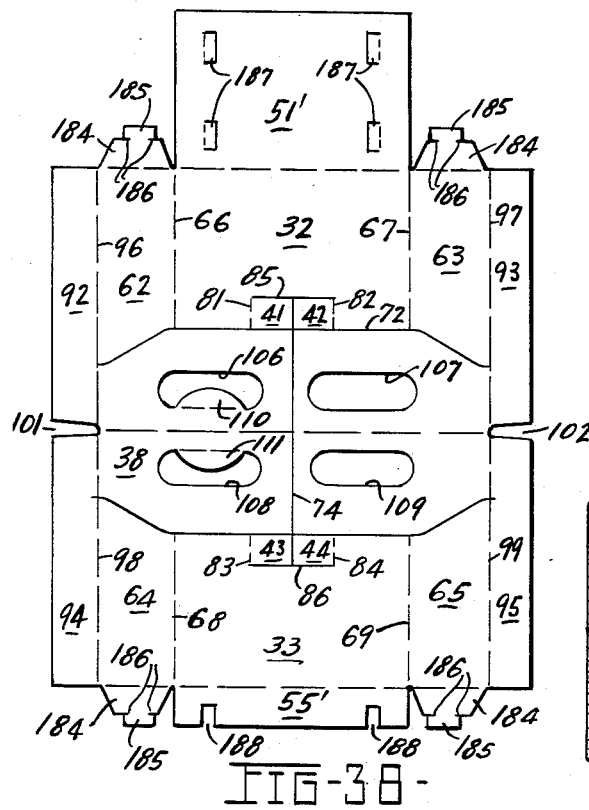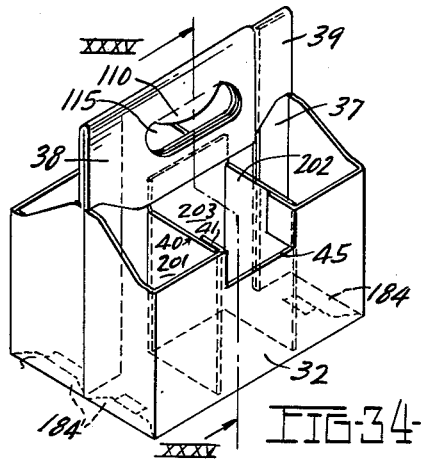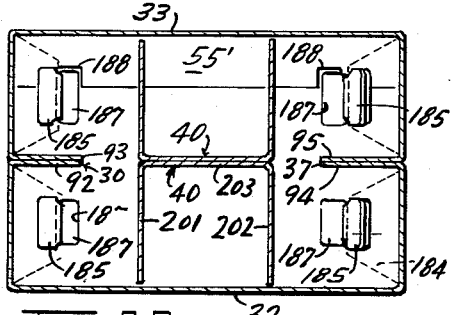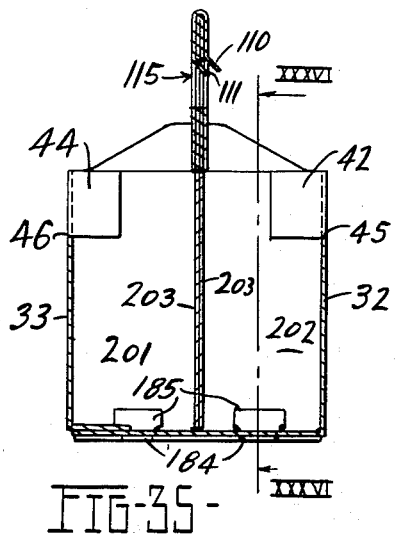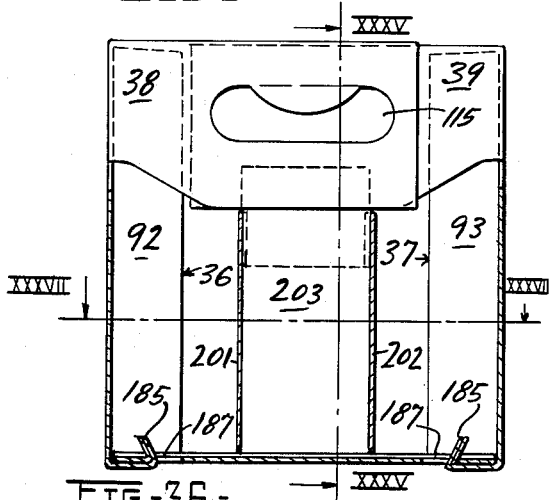

United States Patent Office 3,229,849
Patented Jan. 18, 1966

3,229,849
COMPARTMENTED ARTICLE CARRIER
George A. Spillson, Monroe, Mich., assignor to Consolidated Packaging Corporation, Monroe, Mich., a corporation of Michigan
Filed Jan. 23, 1964, Ser. No. 339,815
23 Claims. (Cl. 220—113)

This invention relates to a collapsible carrier having a plurality of compartments, one for each of a plurality of articles to be carried. More particularly, it deals with such a carrier formed of flexible sheet material, such as paperboard, which may be formed and shipped in a collapsed or knocked-down position and then set up by the customer to provide a plurality of fully separated compartments for articles, such as for example, bottles for soft drinks, beer, and the like.

It is an object of this invention to produce a simple, efficient, effective, economic, and durable collapsible fully partitioned paperboard article carrier.

An important object of this invention is to provide such a carrier in which the bottom thereof is attached to all four sides thereof, once it is set up, thereby materially increasing its life and strength.

A further object of this invention is to produce such a carrier having an improved bottom attached to both the sides and ends of the carrier which may be set up by the consumer thereof, without the application of glue or other adhesive.

Another object of this invention is to produce such a carrier having reinforcing end ribs of more than one thickness of paperboard.

Another object is to produce such a carrier having full-length paperboard partitions separating any fragile articles placed therein, such as glass bottles, to prevent such articles from knocking against one another, thereby reducing their breakage.

Another object of the invention is to produce such a carrier having separately inserted full length partitions attached to both the sides as well as the handle portion of the carrier.

Still another object is to produce such a carrier in which the center of each side of the carrier is notched downwardly thereby permitting more outward flexibility of the central articles, such as long necked bottles, and thereby permitting easier grasping of the handle of the container between the necks of said central bottles without decreasing the strength of the carrier.

Another object is to produce such a carrier in which the handle comprises four thicknesses of paperboard throughout its entire extent from its end walls through its intermediate partitions.

Another object is to produce such a paperboard carrier having an improved multi-ply handle which has a hand hole therein having edges of reduced sharpness, thereby facilitating the grasp and carrying thereof.

Still another object is to produce such a carrier having its upper and handle portions thereof reinforced with an additional ply of paper or similar material.

Generally speaking, the collapsible compartmented carrier of this invention comprises a bottom wall, two opposite side walls, two opposite end walls each having an inward and vertically extending ribs, double telescopic handle portions integral with the tops of said ribs, and a pair of separate U-shaped partitions attached back to back and to said handle portions, with the ends of their leg sections attached to hinged tabs cut from the upper center of each side wall. If desired, these two U-shaped partitions also may include flanges at the ends of their legs for further attachment to the inside of the side walls of the carrier. This carrier is formed from a sheet material, such as paperboard, and the inwardly and vertically extending ribs are formed from centrally inwardly bent flanges on the equal panel sections of each end wall. The two telescopic handle portions each comprise two sections joined together along a medial fold line and form a four ply handle when the container is assembled.

The bottom of the carrier is not only attached integrally along a fold line to the opposite side walls of the carrier, but also, when the carrier is set up, is attached to the end walls of the carrier, such as by glued or bonded tabs, or by hook tabs, which tabs are either provided on the end panels which fasten to the bottom, or on the ends of the bottom and fasten to the end walls. Furthermore, the hand hole in the handle may be so formed to provide a flap which bends back around one or more plies of paperboard of the handle, and/or an outer ply stepped back from an inner ply to provide a more rounded edge to the hand hole for an easier grip therein. The handle and upper portion of the carrier also may be reinforced by an additional ply of paper applied to the blank before it is cut.

The carrier is formed from three blanks, the major blank forming the side and end walls and handle portions of the carrier, and the two other identical blanks forming the U-shaped partitions which are fastened, such as by bonding or gluing, to the major blank as it is folded. Several different methods may be used for fastening the partition blanks to the major blanks before the major blanks are folded and assembled into a collapsed carrier ready for shipment to a consumer. After the partitions are inserted, the major blanks are folded in a gluing machine along one end edge to telescope the handle portions; then the bottom and other end rib flanges are folded in, and glue is applied to them; and lastly the blanks are folded along the medial lines through the handle sections to form the two ply vertical ribs and attach the bottom to the opposite side, as well as the last pairs of plies of the handle, all resulting in an assembled carrier in its collapsed position.

The above mentioned and other features and objects of this invention and the manner of attaining them will become more apparent and the invention itself will be understood best by reference to the following description of several embodiments of the invention taken in conjunction with the accompanying drawings, wherein:

FIG. 1 is a perspective view of a set-up six bottle full-partition paperboard carrier according to one embodiment of this invention;

FIG. 2 is a perspective view of the bottle carrier of FIG. 1 in its substantially collapsed position after it has been assembled and as it is ready to be set up by the consumer;

FIG. 3 is a slightly enlarged vertical sectional view taken along line III—III of the carrier in FIG. 1;

FIG. 4 is a horizontal sectional view taken along line IV—IV of FIG. 3 showing the positions of bottles in the carrier in dashed lines;

FIG. 5 is a horizontal sectional view through the handle taken along line V—V of FIG. 1, showing at least four plies of paperboard throughout the extent of the handle;

FIG. 6 is a perspective view of just the two partitions as they appear in a carrier of FIG. 1;

FIG. 7 is a plan view of the major blank of the outsides and handle, cut and creased, for producing the carrier as shown in FIGS. 1 and 2;

FIG. 8 is a plan view of one of the two identical minor blanks which form the partitions shown assembled in FIG. 6;

FIG. 9 is a perspective view of another embodiment of a carrier, similar to that shown in FIG. 1, but employing partitions with additional side engaging flaps;

FIG. 10 is a perspective view of just the partitions shown in the carrier of FIG. 9;

FIG. 11 is a plan view of one of the two identical blanks which form the partitions shown in FIG. 10;

FIG. 12 is a slightly enlarged vertical section taken along line XII—XII of the carrier in FIG. 9;

FIG. 13 is a horizontal vertical section taken along line XIII—XIII of FIG. 12;

FIG. 14 discloses a partial view of the blank shown in FIG. 7 with the partition blank shown in FIG. 11 thereon, and one of the tabs of the side folded back and glued in place to one end of said partition blank, as the first step in assembling the carrier shown in FIG. 9;

FIG. 15 is the next step in assembling the carrier from FIG. 14 showing the partition blank folded over and the other end thereof glued in place to the other side tab;

FIG. 16 is a following assembly step of telescoping and gluing the handle portions together by folding over one pair of end walls of the major blank, and of the folding in of the rib flanges of the other pair of end wall panels for gluing;

FIG. 17 shows the last steps in assembly of the carrier by folding over along the center line of the handle sections and gluing the handle sections together, and the gluing of the rib flanges together to form the vertical ribs at the ends of the carrier, before the bottom is folded along its center line and glued, to form the collapsed carrier similar to that shown in perspective in FIG. 2;

FIG. 18 is a perspective view of another embodiment of the carrier of this invention, but showing the tabs on the bottom attached to the end walls, and the tabs in the side walls on the outside of the U-shaped partition elements instead of on the inside as shown in FIG. 1;

FIG. 19 is a view of the major blank for forming the carrier shown in FIG. 18 with the tabs on the side walls for attachment to the partitions being folded inwardly for gluing before the partition elements are inserted thereon;

FIG. 20 is one of the partition elements folded ready for assembly onto the blank shown in FIG. 19;

FIG. 21 is a partial view of the blank of FIG. 19 with the folded partition element shown in FIG. 20 in place glued to one of the side wall tabs;

FIG. 22 is a partial view of the blank showing the next step from FIG. 21 in gluing the other end of the partition element to the other side wall tab by folding the other tab over onto it;

FIG. 23 is a perspective view of still another embodiment of this invention, similar to FIG. 1 or 18, but having a reinforced handle and showing both tabs from one side attached to the same side of the partition elements;

FIG. 24 is a view of the blank similar to FIG. 7 but with a reinforcing center ply and only one of the tabs of each side folded over for the addition of a partition piece as shown in FIG. 8;

FIG. 25 is a partial view of the blank in FIG. 24 with the partition strip of FIG. 8 in position thereon and the other unfolded side tab folded thereover and glued to said partition;

FIG. 26 is a partial view of the blank showing the next step from FIG. 25 in folding over the partition for gluing to the first folded over side tab;

FIG. 27 is an enlarged sectional view taken along line XXVII—XXVII of FIG. 23 showing the reinforcing ply in the handle and inside the upper portion of the carrier;

FIG. 28 is a perspective view of a further embodiment of this invention, similar to FIG. 18, but having easy lifting hand holes in the handle and bottom locking tabs which anchor into apertures in the ends of the carrier, instead of being glued or bonded thereto;

FIG. 29 is a slightly enlarged end view of the carrier shown in FIG. 28;

FIG. 30 is a vertical sectional view taken along line XXX—XXX of FIG. 29;

FIG. 31 is a sectional view taken along line XXXI—XXXI of FIG. 30 of the bottom of the carrier;

FIG. 32 is an enlarged vertical sectional view taken along line XXXII—XXXII of FIG. 30 showing how the handle has its hand hole stepped, and with a turned over flap for easy grip of the person carrying the carrier;

FIG. 33 is a plan view of the major blank for forming the carrier of FIG. 28, having locking tabs at the ends of its bottom section, which tabs anchor into apertures provided therefor in the end panels, and showing the hand holes and flap for forming the handle shown in FIG. 32;

FIG. 34 is a perspective view of still another embodiment of the carrier of this invention having locking tabs as shown in FIG. 28, but formed on the end panels for locking into apertures in the bottom, instead of on the bottom as shown in FIG. 28 and instead of being glued or bonded to the bottom as shown in FIG. 1;

FIG. 35 is a slightly enlarged vertical sectional view taken along line XXXV—XXXV of FIG. 34 or 36;

FIG. 36 is a vertical sectional view taken along line XXXVI—XXXVI of FIG. 35;

FIG. 37 is a sectional view taken along line XXXVII—XXXVII of FIG. 36 showing the bottom; and FIG. 38 is a plan view of the major blank from which the carrier of FIG. 34 is formed, having locking tabs on its end panel sections for anchoring into the apertures in the bottom.

I.—THE CARRIER BODY

Referring now to FIGS. 1 through 4, there is disclosed one embodiment of the carrier 30 of this invention comprising generally a bottom 31, a pair of parallel center notched side walls 32 and 33; a pair of end walls 34 and 35 having centrally inwardly extending ridges 36 and 37 integrally connected to a pair of two ply telescopic overlapping handle sections 38 and 39; and a pair of U-shaped partition members 40, anchored back to back as shown in FIG. 6, and attached to the central part of the handle portion with their ends attached to flaps 41, 42, 43, 44 knocked out of the central notches 45, 46 of the two side sections 32 and 33, respectively, to divide the container into six substantially equal rectangular compartments for containers, such as bottles B shown in dashed lines in FIG. 4.

I-A.—The bottom

More specifically, and referring to the blank 50 shown in FIG. 7, the bottom 31 herein may comprise a whole rectangular panel section 51 creased substantially along its center line 52, and hinged to the bottom edge of the side 32 along crease line 53. Hinged along the bottom edge or crease line 54 of the other side 33 is a bottom flap 55 to which the outer end or edge of the bottom section 51 is attached, such as by bonding or gluing when the carrier is assembled, as will be described later. If desired, the bottom section 51 may be provided with drainage apertures 56, which may be centered with each compartment of the carrier as shown in FIG. 13.

I-B.—The side walls

The side walls 32 and 33 are shown attached to the end panels 62, 63, 64, 65 along their end edges by crease or fold lines 66 and 67 for the side wall 32, and fold lines 68 and 69 for the side wall 33, so that end panels 62 and 64 form end wall 34 when assembled, and end panel 63 and 65 form end wall 35 when assembled.

The top of the side walls 32 and 33 are separated by cut lines 72 and 73, respectively, from the double handle sections 38 and 39, which double handle sections are separated from each other by a transverse cut 74. This cut 74 may extend into the bottoms of the notches 45 and 46 in the center of the walls 32 and 33 thereby also separating the two tabs 41, 42 on side wall 33, and tabs 43 and 44 on side wall 32. These tabs are bent along the correspondingly vertical groove lines 81, 82, 83, 84, respectively, and are separated from the side walls 32 and 33 along horizontal cut lines 85 and 86 forming the bottom of the notches 45 and 46 at the terminations of the cut line 74.

1-C.—End walls and ribs

The panels 62, 63, 64 and 65 of the end walls 34 and 35 have joined along their edges opposite the fold lines 66, 67, 68 and 69 hinged flanges 92, 93, 94 and 95, respectively (see FIG. 7), which are folded inwardly and glued together in adjacent pairs to form the vertical rib 36 (from the flanges 92 and 94) and rib 37 (from the flanges 93 and 95). The joining fold lines or creases 96, 97, 98 and 99 for the flanges 92, 93, 94 and 95, repectively, also extend along and connect to the ends of the handle sections 38 and 39, so that the upper or inner ends of the fold lines 96 and 98 connect handle section 38 to rib 36, and the upper or inner ends of fold lines 97 and 99 connect handle section 39 to rib 37.

1-D.—Handles

Centrally of the blank 50 shown in FIG. 7, there are provided two overlapping handle sections 38 and 39 creased along a center line 100, notched at its ends 101 and 102 to separate the adjacent and upper ends of rib flanges 92, 94 and 93, 95, respectively, and to permit folding assembly of the carrier. Thus, the cut line 74 and the center crease line 100 divide the handle sections 38 and 39 into four substantially equal portions or parts, each of which is provided with hand holes 106 and 108 for the section 38, and hand holes 107 and 109 for the section 39. The former two of which handle holes 106 and 108, for outer or overlapping handle section 38, may also be provided with one or more flaps 110 and 111 depending from the upper edge of the combined hand hole 115, which flaps 110, 111 may be folded along crease lines 112 and 113 to avoid any sharp edges on the outer plies of the handle of the carrier from cutting of the fingers of the person carrying the carrier 30. These four handle openings or holes 106 through 109 are in substantial alignment when the carrier is assembled to form the hand hole 115 as shown in FIGS. 1, 2 and 9. The outer ends of these handle sections 38 and 39 are integrally attached to the upper ends of the ribs 36 and 37, respectively, along fold lines 96, 98 and 97, 99, as previously mentioned, which integral connection materially strengthens their support of the ends of the carrier. Between the handle sections 38 and 39, the upper portions or flaps of the base panels of the U-shaped partitions 40 or 40' are also anchored, as will be described later, which further gives a positive support to the carrier 30 intermediate of its ends 34 and 35.

If desired, the blank 50 may be made of lesser thickness and/or strength paperboard sheets, and only the central portion of the blank, comprising the handle sections 38 and 39, upper ends of the ribs 36 and 37 and the upper portions of the end and side walls 32, 33, 34 and 35 including the partition attaching tabs 41, 42, 43 and 44, may be overlayed with an additional ply of fibrous, plastic, or other sheet material, such as kraft paper 120 shown on the blank in FIG. 24, and shown enlarged in the section of the handle in FIG. 27. This additional ply 120 may be glued or bonded to the center portion of each blank 50 before it is die-cut.

Referring now to FIGS. 28 through 33, there is shown another embodiment of multiple ply handle for this type of carrier 30, in which the holes 126' and 128' in the outer handle section 38', instead of each having a flap 110 and 111 as before, only the hole 128' is provided with a flap 131 which is folded in between the two parts or portions of the inner or overlapped handle section 39 during assembly to round-off the edge of hand hole 115 on that side of the handle. The other hand hole 126' in section 38' is made slightly wider or higher to form a stepped edge 133 (see FIGS. 30 and 32) when assembled, to reduce a sharp edge on the other side of the handle for hand hole 115.

II.—PARTITIONS

The central full length U-shaped partition member 40 may be composed of a pair of blanks 200 as shown in FIG. 8, having two equal side panels, or legs 201 and 202 and a central longer or higher panel or base 203. Thus central longer panels 203, as shown in FIGS. 1 and 3, fit up and are attached between the overlapping handle sections 38 and 39. To the outer ends of the outer upper corners of the leg panels 201 and 202 there are attached, such as by glue or bonding, the tabs 41, 42, 43 and 44 as shown in FIGS. 1, 3, 4, 9, 12 and 13.

If desired the U-shaped partition pieces 40 may be modified as shown in FIGS. 10 and 11 for partition pieces 40' made from a blank 200' having end flanges 204 and 205 attached to the outer edges of the panels 201 and 202, respectively, for further attachment to the inside of the side walls 32 and 33, as shown in dotted lines in FIGS. 9 and 12, thereby better anchoring these U-shaped partitions 40' in position as well as strengthening the carrier 30 as a whole.

III.—ASSEMBLY

Referring now to FIGS. 14 through 17, the carrier shown in FIG. 9 is assembled to the collapsed form similar to that shown in FIG. 2 from the blanks shown in FIGS. 7 and 11. However, the assembly of the carrier shown in FIG. 1 from the blanks shown in FIGS. 7 and 8 is performed in the same manner, the only difference being in the partitions 200 and 200', the latter having its flaps 204 and 205 being attached also by bonding or gluing to the inside of the side walls 32 and 33 of the carrier.

Referring first to FIG. 14, a portion of the major blank in FIG. 7 is shown with the partition blank 200' of FIG. 11 in position thereon with the glued tab 43 folded back along its fold line 83 over upper corner of panel 202 and projecting above the flange 205. The portions of the blank 50 which will contact the flanges 204 and 205 may be glued (see speckled patch 141 in FIG. 14) at the same time as the tabs 41, 42, 43, and 44 are glued. Also the handle sections 38 and 39 as shown speckled in FIG. 7, may be glued at this same time, however, only part of half of the inner handle section 39 need be glued. The partition blank 200' is then folded as shown in FIG. 15 along its crease line between panels 203 and 202 to the position where the flap 204 is adhered to the glued patch 141, so that this partition 40' is now attached to the side wall 32.

After the previous step, the major blank 50 is then folded along crease lines 67 and 69 between the end panel sections 63 and 65 of the side walls 32 and 33 into the position shown in FIG. 16, so that the handle section 39 overlaps the handle section 38, and the pairs of hand holes 106, 107 and 108, 109, respectively, are in alignment. The next step in the process is to fold over the rib flanges 92 and 94 and glue them, which gluing may be done at the same time as the already folded over rib flanges 93 and 95. Now the partly folded blank in FIG. 16 is ready to be folded along the center line 100 of the overlapping handle sections into the form shown in FIG. 17, in which only the bottom flap 55 remains to be glued, and the bottom 51 folded along its center line 52 over on to said flap 55 to completely assemble the carton. However, if the taps 162 through 165 (described later) for attaching the bottom 31 to the ends 34 and 35 were on the bottom as shown in FIG. 19 instead of the end panels as shown in FIG. 7, then the bottom flap 55 could have been turned over and glued in the step of FIG. 16, and then the final step would be the folding for complete assembly along the handle center line 100.

In FIGS. 18 and 23 there are shown perspective views of other embodiments of this invention in which the side wall tabs 41 through 44 forming the notches 45 and 46 are folded and attached to the U-shaped partition legs in a different manner than shown in FIG. 1, where they are both on the inside of the U-shaped partitions 40 or 40'. In FIG. 18 these tabs 41 through 44 are both on the outside of the partition panels 201 and 202, and such attachment is assembled according to FIGS. 19 through 22. On the other hand, the assembly shown in FIG. 23, wherein both tabs are on the same side of the partition panels 201 and 202, such attachment is assembled according to FIGS. 24 through 26. In the former of these assembly methods, the partition blank 200 or 200' has its panel 201 folded under panels 203 as shown in FIG. 20, before being placed on the major blanks 50' or 50 as shown in FIG. 19. However, the major blanks in each of these two assembly methods are prepared differently.

In the first method of FIG. 18, the major blank 50' is prepared by folding over all of the side wall tabs 41 through 44 and gluing their outer surfaces as shown speckled in FIG. 19. Then the folded partition strip 200 shown in FIG. 20 is layed thereover as shown in FIG. 21 with the upper corner of folded under panel 201 on tab 43. Next the tab 44 is folded over the partition panel 202 along its hinge line 84 as shown in FIG. 22 for anchoring the upper corner of the panel 202 to the side wall 33.

In the embodiment shown in FIG. 23, only one pair of the tabs, namely tabs 42 and 44 on the major blank 50 shown in FIG. 24 is folded over and glued while the other tabs 41 and 43 are glued in their initial position, as shown in FIG. 24. The partition blank 200 or 200' as shown in FIG. 8 or 11, respectively, is then layed down as shown in FIG. 25, and the unfolded tab 43 which has just been glued is folded over upon the upper corner of panel 202 thereof. Then, the partition 200 is folded along its fold line between its panels 203 and 202 to the position shown in FIG. 26 where the tab 44 is then folded back around its fold line 84 and over the upper corner of the panel 202 for anchoring it to the side wall 33.

The remaining steps for assembling the carriers of FIGS. 18 and 23 are then similar to those shown and described above regarding FIGS. 16 and 17.

IV.—ATTACHMENTS BETWEEN BOTTOMS AND ENDS

In FIGS. 1 through 17 and 23 through 26 there are disclosed bottom tabs 162, 163, 164 and 165 hinged to the lower ends of the end panels 62, 63, 64 and 65, respectively, which bottom tabs may be glued, bonded or otherwise attached to the under side of the bottom 31 or panel 51 after the carrier 30 is set up as shown in FIGS. 1, 9 and 23.

In FIGS. 18 through 22, the tabs 162', 163', 164', 165' for attachment to the bottom 31 to the ends 34 and 35 of the carrier, are hinged to the ends of the bottom panel 51, and when the carrier is set up as shown in FIG. 18 by the customer, the tabs 162', 163', 164' and 165' are glued, bonded or otherwise attached to the outside of the adjacent lower ends of the end panels 62, 63, 64 and 65, respectively.

In order to avoid the necessity of having a gluing or bonding machine or apparatus for the attachment of the tabs 162 through 165 or 162' through 165' in a set-up carrier, there may be provided flaps with deformable locking tabs which lock in apertures provided therefor in adjacent panels as shown in FIGS. 28 through 38.

Referring first to the locking tabs of FIGS. 28 through 31 and 33, the bottom panel 51 has hinged to opposite ends thereof flaps 172 and 173, each of which flaps has projecting outwardly therefrom two spaced locking tabs 175. Each of these locking tabs is slit at 176 (see FIG. 33) inwardly at both sides of its base and bendable connection to its flap 172, 173 so that the opposite sides of the locking tabs can be deformed to fit in the semi- cut-out apertures 177 provided therefor near the bottoms of each of the adjacent end panels 62', 63', 64' and 65'. The fold lines 178 for each of the end panel cut-outs 177 are adjacent, when set up, to the bendable connection and slits 176, so that when the locking tabs 175 are in their locking position as shown in FIGS. 28 through 31, the panel cut-outs fold inside the carrier under the tabs 175 which are forced through the narrower apertures 177 formed in the end panels by bending of the opposite sides of the locking tabs 175 past the adjacent and closer spaced ends of the apertures 177.

Furthermore, in this embodiment of FIGS. 28 through 31, the flaps 172 and 173 may have off-set slits 181 at the center of their fold lines attaching them to the ends of the bottom panel 51, into which slits 181 projections 182 on the inner corners of the end panels 62', 63', 64' and 65' are inserted when carrier is set up. These off-sets 181 and projections 182 then act also as center end leg type supports for the carrier.

In FIGS. 34 through 38, there is shown another type of end and bottom locking attachment, using locking tabs on the end panels 62 through 65 instead of on the bottom panel 51 as shown in FIG. 33, and having cooperating locking apertures in the bottom panel 51'. Thus each end panel 62, 63, 64 and 65 has hinged to its lower edge a trapezoidal shaped flange 184 to the outer end of each of which is a bendable and deformable locking tab 185 with slits 186 at its base, similar to locking tabs 175. These tabs 185 have hinged sides which can be bent and forced through adjacent semi-cut-out apertures 187 in the bottom panel 51'. The semi-cut-outs 187 are bent inside the carrier with the locking tabs 185 when put into locking position. In order to prevent the bottom flap 55' from interferring with the locking tabs 185, notches 188 may be provided therein as shown in FIGS. 37 and 38.

Accordingly, several different types of end attached bottoms, handles, and partitions may be provided with the partitioned carrier of this invention without departing from its scope, so that any one of the handles, bottom attachments, and/or partitions may be used with any of the other handles, bottom attachments, and/or partitions shown in the views described above. Thus, it is to be clearly understood that the principles of this invention in connection with specific apparatus as described above is made only by way of example and not as a limitation to the scope of this invention.

What is claimed is:
1. A collapsible compartment carrier comprising:
    (a) a bottom wall,
    (b) two opposite end walls each having an inwardly and vertically extending rib,
    (c) two handle sections one joined to each said ribs,
    (d) a pair of U-shaped partition pieces having extending back panels joined to said handle sections, and having outwardly extending substantially parallel side leg panels, and
    (e) two opposite side walls, each having a central rectangular notch in its upper edge and at least one integral ear extending inwardly from a side edge of said notch, said ear being joined to an outwardly extending adjacent one of said parallel side leg panels of said partition pieces.

2. A carrier according to claim 1 produced from three separate pieces of paperboard; said two U-shaped partition pieces comprising two of said pieces.

3. A carrier according to claim 1 having two rows of three equal compartments separated by said partition pieces.

4. A carrier according to claim 1 wherein said pair of partition pieces are joined back to back in said carrier.

5. A carrier according to claim 1 wherein said ear is attached to the inside of the adjacent one of said panel legs of said partition pieces.

6. A carrier according to claim 1 wherein said ear is attached to the outside of the adjacent one of said panel legs of said partition pieces.

7. A carrier according to claim 1 wherein said panel legs of said partition pieces are each provided with an end flange, and means for attaching said end flanges to the inside of their adjacent side wall of said carrier.

8. A carrier according to claim 1 wherein both said handle sections comprise four plies of material extending substantially the full length of said carrier, and wherein said four plies are adhered one to the other.

9. A carrier according to claim 1 wherein at least one of the hand holes in the outer handle section has a fold-over flap on its upper side to avoid a sharp hand cutting edge in said hand hole.

10. A carrier according to claim 1 including means for attaching said bottom wall to each of said end walls, comprising a flap on one wall and means to attach it to the adjacent wall.

11. A carrier according to claim 10 wherein said means to attach said flap comprises bonding.

12. A carrier according to claim 10 wherein said means to attach said flap comprises an adhesive.

13. A carrier according to claim 1 wherein said central notch has a pair of ears extending inwardly from the opposite edges of said notch, each ear being joined to an outwardly extending adjacent one of said parallel side leg panels of said partition pieces.

14. A carrier according to claim 13 wherein said ears are attached to the inside of said panel legs of said partition pieces.

15. A carrier according to claim 13 wherein said ears are attached to the same side of each panel leg of the partition pieces.

16. A carrier according to claim 13 wherein said ears are attached to the outside of said panel legs of said partition pieces.

17. A collapsible paperboard carrier comprising:
(a) a bottom wall,
(b) two opposite side walls, each having a central rectangular notch in its upper edge and at least one integral ear extending inwardly from a side edge of said notch,
(c) two opposite end walls each having a centrally inwardly and vertically extending rib,
(d) two overlapping handle sections one joined to the upper portion of each said rib, each of said handle sections having two aligned hand holes therein, the width of said hole in the outer one of said sections being greater than that of the hole in the inner of said sections, whereby the upper edge of the hand holes are stepped to avoid a sharp hand-cutting edge, and
(e) a pair of U-shaped partition pieces having upwardly extending back portions joined to said handle sections, and having outwardly extending substantially parallel side panels, said ears on said side walls being joined to adjacent ones of said outwardly extending parallel side panels of said partition pieces.

18. A carrier according to claim 17 including a fold over flap on one side of the outer one of said hand sections, which flap folded in between the inner one of said handle sections.

19. A collapsible compartment carrier comprising:
(1) a bottom wall,
(2) two opposite end walls each having:
  (a) an inwardly and vertically extending rib,
  (b) flap means on each side of said rib for joining said end walls to said bottom wall,
(3) two handle sections one joined to the upper portion of each said rib, each having handle sections having two aligned hand holes therein,
(4) a pair of U-shaped partition pieces having extending back panels joined to said handle sections, and having outwardly extending substantially parallel side panels, and
(5) two opposite side walls each having a central rectangular notch in its upper edge and at least one integral ear extending inwardly from one side edge of said notch, said ear being joined to an adjacent one of said outwardly extending parallel side panels of said partition pieces.

20. A carrier according to claim 19 wherein one of said handle sections comprises a fold over flap.

21. A carrier according to claim 19 wherein the width of the hole in the outer one of said handle sections is greater than the hole in the inner one of said sections, whereby an upper inner edge of said hand hole is stepped to avoid a sharp hand cutting edge.

22. A carrier according to claim 19 wherein each parallel side panel of said partition pieces is provided with a lower partial right angled end flap, and said partial right angled end flaps are joined to the inside of the adjacent one of said side walls.

23. A collapsible compartment carrier comprising:
(1) a bottom wall,
(2) two opposite end walls each having inwardly and vertically extending rib,
(3) two handle sections, one joined to each said rib,
(4) a pair of U-shaped partition pieces having extending back panels joined to said handle section, and having outwardly extending substantially parallel side panels,
(5) two opposite side walls each having a central rectangular notch in its upper edge and at least one integral ear extending inwardly from a side edge of said notch, said ear being joined to an adjacent one of said outwardly extending parallel side panels of said partition pieces, and
(6) separate interlocking means between said bottom wall and said end walls on at least one side of said rib, said interlocking means comprising:
  (a) a flap with a hinged ear with deformable end portions, said flap hinged to the edge of one of said walls, and
  (b) an aperture in the other of said walls spaced from said edge the width of said flap, said aperture being substantially equal in length to said ear less said deformable end portion, whereby said ears are forced through said aperture and bent back toward said one of said walls and said deformable end portions anchor said ears in said apertures.

References Cited by the Examiner
UNITED STATES PATENTS

| | | | |
|---|---|---|---|
| 2,372,351 | 3/1945 | Arneson | 220—111 |
| 2,689,061 | 9/1954 | Gray | 220—113 |
| 3,011,677 | 12/1961 | Struble | 220—113 |
| 3,017,054 | 1/1962 | Forrer | 220—113 |
| 3,031,100 | 4/1962 | Bundy et al. | 220—113 |
| 3,053,411 | 9/1962 | Struble et al. | 220—113 |
| 3,054,527 | 9/1962 | Goldring | 220—113 |

JOSEPH R. LECLAIR, *Primary Examiner.*

FRANKLIN T. GARRETT, *Examiner.*